US010351025B2

(12) United States Patent
Scherello et al.

(10) Patent No.: US 10,351,025 B2
(45) Date of Patent: Jul. 16, 2019

(54) VEHICLE SEAT, IN PARTICULAR A PASSENGER SEAT FOR A BUS

(71) Applicant: MAN Truck & Bus AG, Munich (DE)

(72) Inventors: Michael Scherello, Munich (DE); Achim Burmeister, Bergkirchen (DE)

(73) Assignee: MAN TRUCK & BUS SE, Munich (DE)

( * ) Notice: Subject to any disclaimer, the term of this patent is extended or adjusted under 35 U.S.C. 154(b) by 0 days.

(21) Appl. No.: 14/323,239

(22) Filed: Jul. 23, 2014

(65) Prior Publication Data
US 2015/0028634 A1    Jan. 29, 2015

(30) Foreign Application Priority Data

Jul. 24, 2013  (DE) .......................... 10 2013 012 291

(51) Int. Cl.
*B60N 2/01* (2006.01)
*B60N 2/24* (2006.01)
(Continued)

(52) U.S. Cl.
CPC ............... *B60N 2/242* (2013.01); *B60N 2/01* (2013.01); *B60N 2/22* (2013.01); *B60N 2/2209* (2013.01);
(Continued)

(58) Field of Classification Search
None
See application file for complete search history.

(56) References Cited

U.S. PATENT DOCUMENTS

| 1,750,873 A | * | 3/1930 | Buck | F24F 13/0604 |
| | | | | 454/322 |
| 2,635,681 A | * | 4/1953 | Hiltman | B60Q 3/0223 |
| | | | | 297/217.6 |

(Continued)

FOREIGN PATENT DOCUMENTS

| CN | 1847049 A | 10/2006 |
| CN | 1944111 A | 4/2007 |

(Continued)

OTHER PUBLICATIONS

Chinese Office Action dated Jun. 27, 2017 in parallel Chinese Patent Application 201410355449.

(Continued)

*Primary Examiner* — David R Dunn
*Assistant Examiner* — Christopher E Veraa
(74) *Attorney, Agent, or Firm* — Lucas & Mercanti, LLP

(57) ABSTRACT

A vehicle seat, in particular a passenger seat for a bus, includes a seat member with a seat upholstery carrier and seat upholstery, which is rigidly arranged on the seat upholstery carrier; the vehicle seat also includes a backrest with a back upholstery carrier and back upholstery, which is rigidly arranged on the back upholstery carrier; and a support structure for receiving forces which act on the vehicle seat. The support structure is constructed as a rigid carrier frame arranged at the peripheral side outside the seat member and the backrest and which is connected to the seat upholstery carrier and the back upholstery carrier. The carrier frame has carrier rails which are arranged in pairs and which extend along opposing lateral edges of the seat member and the backrest.

17 Claims, 5 Drawing Sheets

(51) Int. Cl.
  *B60N 2/22* (2006.01)
  *B60N 2/56* (2006.01)
  *B60N 3/00* (2006.01)
  *B60N 2/68* (2006.01)
  *B61D 33/00* (2006.01)
  *B60Q 3/44* (2017.01)
  *B60N 2/885* (2018.01)
  *B60N 2/803* (2018.01)

(52) U.S. Cl.
  CPC ......... *B60N 2/5621* (2013.01); *B60N 2/5642* (2013.01); *B60N 2/68* (2013.01); *B60N 2/803* (2018.02); *B60N 2/885* (2018.02); *B60N 3/001* (2013.01); *B60Q 3/44* (2017.02); *B61D 33/0014* (2013.01)

(56) References Cited

U.S. PATENT DOCUMENTS

| | | | | |
|---|---|---|---|---|
| 3,323,835 A * | 6/1967 | Barecki | ............ | A47C 7/30 297/228.13 |
| 3,827,752 A * | 8/1974 | Bissinger, Sr. | ........ | B60N 2/242 297/452.2 |
| 5,385,382 A * | 1/1995 | Single, II | ........... | A47C 7/74 297/180.13 |
| 5,836,547 A | 11/1998 | Koch et al. | | |
| 5,984,417 A * | 11/1999 | Wang | ............ | A47B 13/06 108/158.11 |
| 5,992,798 A * | 11/1999 | Ferry | ............ | A47C 1/0352 105/316 |
| 6,641,214 B2 * | 11/2003 | Veneruso | ............ | B60N 2/0232 297/216.15 |
| 6,692,069 B2 * | 2/2004 | Beroth | ........... | A47C 1/0352 244/118.6 |
| 6,742,842 B2 * | 6/2004 | Dowty | ............ | B64D 11/06 297/184.14 |
| 7,029,065 B2 | 4/2006 | Laib | | |
| 7,134,729 B2 * | 11/2006 | Dowty | ............ | B64D 11/06 297/343 |
| 7,322,604 B2 | 1/2008 | Itoga et al. | | |
| 7,354,019 B2 * | 4/2008 | Bauer | ............ | A47C 7/74 244/118.6 |
| 7,837,259 B2 * | 11/2010 | Staab | ............ | B64D 11/06 244/118.5 |
| 7,874,618 B2 * | 1/2011 | Kohl | ............ | B60N 2/2209 297/284.4 |
| 8,091,961 B2 * | 1/2012 | Dryburgh | ............ | B60N 2/01 297/184.1 |
| 8,511,748 B2 | 8/2013 | McLeod et al. | | |
| 9,399,415 B2 * | 7/2016 | Serber | ............ | B60N 2/0745 |
| 9,401,591 B2 | 7/2016 | Satou et al. | | |
| 2003/0111888 A1 * | 6/2003 | Brennan | ............ | B60N 2/0284 297/316 |
| 2005/0253436 A1 | 11/2005 | Dowty et al. | | |
| 2006/0055214 A1 * | 3/2006 | Serber | ............ | B60N 2/0745 297/216.1 |
| 2006/0103211 A1 | 5/2006 | Garrido | | |
| 2006/0103228 A1 * | 5/2006 | Gupta | ............ | B29C 49/4802 297/452.65 |
| 2007/0080527 A1 | 4/2007 | Itoga et al. | | |
| 2007/0080570 A1 | 4/2007 | Kohl et al. | | |
| 2007/0262568 A1 | 11/2007 | Itoga et al. | | |
| 2008/0053126 A1 * | 3/2008 | Ebigt | ............ | B60N 2/24 62/237 |
| 2008/0211283 A1 * | 9/2008 | Okano | ............ | B60N 2/1821 297/341 |
| 2009/0184561 A1 * | 7/2009 | Wilson | ............ | B60N 2/4214 297/452.2 |
| 2011/0121628 A1 * | 5/2011 | Kauffman | ............ | B60N 2/686 297/354.1 |
| 2014/0265501 A1 * | 9/2014 | Line | ............ | B60N 2/0232 297/341 |

FOREIGN PATENT DOCUMENTS

| | | |
|---|---|---|
| CN | 102046416 A | 5/2011 |
| DE | 10 2006 049 001 A1 | 4/2008 |
| DE | 10 2009 035 405 A1 | 2/2010 |
| EP | 2463974 A1 | 6/2012 |
| FR | 2374185 A1 | 7/1978 |
| WO | 03089299 A1 | 10/2003 |
| WO | 2004074095 A1 | 9/2004 |

OTHER PUBLICATIONS

Chinese Office Action dated Mar. 4, 2019 in parallel Chinese Patent Application 201410355449.

* cited by examiner

VEHICLE SEAT, IN PARTICULAR A PASSENGER SEAT FOR A BUS

CROSS-REFERENCE TO RELATED APPLICATIONS

This application claims the priority of DE 10 2013 012 291.0 filed Jul. 24, 2013, which is incorporated by reference herein.

BACKGROUND OF THE INVENTION

The invention relates to a vehicle seat, in particular a passenger seat for a bus, comprising a seat member, a backrest and a support structure for receiving forces which act on the vehicle seat.

There are known from the prior art vehicle seats, in particular motor vehicle seats, which have a backrest against which the vehicle occupant can lean with his back. In order to provide the necessary stability for the backrest of the known vehicle seats so that it can receive the forces acting on the vehicle seat in a reliable manner, support structures are generally integrated in the backrests. Such forces may, for example, be caused by an impact of a passenger seated behind on the backrest in accordance with the test provisions for buses, by passengers holding onto the seat or handrails which are secured thereto or by the seated passenger. Corresponding support structures may also be integrated in the seat member. The known support structures generally have a metal support frame with longitudinal carriers and lateral struts. An example of such a support structure is disclosed in DE 10 2009 035 405 A1.

The support structures mentioned above have the disadvantage that backrests in which such support structures have to be integrated are costly to produce, have a relatively high weight and the structural space available is accordingly limited.

In order to adjust the inclination of the backrest, an external pivot joint is fitted between the backrest and seat upholstery in such passenger seats. However, such pivot joints limit the spatial region which is available, in particular the knee freedom, for a person located behind the vehicle seat. Furthermore, seat structures which are located within the backrest or the seat carrier prevent pieces of equipment from being able to be subsequently mounted on the seat frame in a simple manner.

Another disadvantage is that an inclination adjustment of the backrest brings about an angular change, for example, of a table which is secured to the rear side of the backrest. In order to prevent this, solutions are known from the prior art which require an additional costly frame in order to decouple the table from the backrest.

DE 10 2006 049 001 B4 further discloses a seat device for an aircraft in which a seat device is arranged on a shell structure which acts at the same time as a closed storage space. However, the shell structure proposed leads to comparatively large dimensions of the seat device. However, in public service buses and coaches, the installation space available for a vehicle seat is not sufficient for such a shell construction. Such seat devices are therefore generally not suitable for installation in public service buses and coaches or significantly limit the space of the passengers sitting behind.

BRIEF SUMMARY OF THE INVENTION

An object of the invention is to provide a vehicle seat which prevents the disadvantages of conventional vehicle seats. The vehicle seat is intended in particular to have compact dimensions and the greatest possible amount of leg freedom, in particular for the person sitting behind. Another object is to provide a vehicle seat which improves the construction possibilities in terms of design technology in the construction of the seat upholstery and fitting of pieces of equipment.

The vehicle seat according to the invention has a seat member and a backrest. The seat member comprises seat upholstery which is rigidly arranged on a seat upholstery carrier. The backrest comprises back upholstery which is rigidly arranged on a back upholstery carrier. The seat upholstery carrier and the back upholstery carrier will also be referred to below as upholstery carriers. The vehicle seat further comprises a support structure for receiving forces which act on the vehicle seat.

The term vehicle seat includes seats for various types of vehicle, for example, land vehicles, such as road or rail vehicles, air vehicles or water vehicles. An emphasized use of the invention relates to a passenger seat for buses, for example, coaches or local transport buses.

According to the invention, the support structure is formed as a rigid carrier frame which is arranged outside the seat member and the backrest. The carrier frame is provided at the peripheral side or laterally on the seat member and the backrest. In this instance, the carrier frame is connected to the seat upholstery carrier and the back upholstery carrier so that they are retained by the carrier frame. Furthermore, forces acting on the seat can be thereby be received by the carrier frame.

Furthermore, the carrier frame has carrier rails which are arranged in pairs and which extend at the peripheral side along opposing lateral edges of the seat member and the backrest. This peripheral-side extension includes the variants that the carrier rails extend only partially along opposing side edges of the seat member and/or the backrest or also along the entire length of the lateral edges of the seat member and/or the backrest.

The carrier rails of the rigid carrier frame may be constructed as profile carriers, rod elements and/or carrier pipes. Furthermore, the carrier frame can be provided in part-regions with additional elements in order to transmit forces which occur. A rigid carrier frame means in this context that the carrier frame is constructed without a movable articulation, in particular without a pivot joint, so that the carrier frame does not also move when a backrest which can be adjusted in terms of inclination is pivoted. However, exceptions are articulation means or other coupling elements for securing vehicle seat components to the carrier frame, in particular articulation means for securing the seat upholstery carrier and the back upholstery carrier.

The support structure according to the invention is consequently not integrated in the backrest or the seat member but arranged visibly outside the upholstery. The forces acting on the vehicle seat are absorbed by the carrier frame according to the invention. Consequently, the carriers for the seat upholstery and the backrest can redirect the forces acting on the seat to the carrier frame and do not have to be constructed to be completely load-bearing alone. Consequently, the complex integration of a heavy carrier frame in the backrest and/or the seat member, which integration is complex in technical production terms, so that these components can be produced in a simpler manner, with reduced weight and/or from alternative materials.

In particular the backrest carrier can be constructed in such a manner that the knee of a person sitting behind is prevented from pressing through. One possibility of the production according to the invention thus makes provision, for example, for the back upholstery carrier to be constructed as a structural unit by an integral shell structure. The seat upholstery carrier can also be produced by an integral shell structure. These can be produced from plastics material or a composite material as a lightweight construction and with a small thickness. It is emphasized that the seat upholstery and the backrest can be constructed in several pieces and in particular can each have an integrated resilient mat and a seat cover. The seat cover can then surround only the upholstery or the upholstery and upholstery carrier. In particular the backrest carrier can be constructed at the rear side as a visible face, that is to say, in such a manner that no additional covers or the like are required. Furthermore, corresponding visible faces can additionally be provided with additional elements, which improve the visual impression or prevent vandalism or traces of use.

As a result of the provision of the carrier frame outside the seat member and the backrest, degrees of freedom in terms of design technology are further achieved in the construction of the carrier frame since it is no longer limited by the dimensions of the seat upholstery and the backrest. It is thus possible, for example, to use profile-members having a larger cross-section and/or alternative materials.

According to a particularly preferred embodiment, the carrier frame is constructed as a hollow structure. A stable carrier frame can thereby be provided with a lightweight construction.

In an advantageous variant of this embodiment, a ventilation and/or heating element is integrated in the hollow structure of the carrier frame. In this instance, the carrier frame may have at a rear side of the vehicle seat discharge openings or ventilation nozzles having a control function or a controller for the ventilation and/or heating element. This has the advantage that the ventilation can be integrated in the hollow structure of the seat frame in a space-saving manner. Furthermore, better operability for the person sitting behind is enabled since a controller which is arranged at the rear side of the front seat can be reached more comfortably than nozzle instruments which are arranged on the vehicle roof. Another advantage is that the air flow is directed onto the passenger from the front instead of from above.

According to another variant of this embodiment, discharge openings of the ventilation and/or heating element can also be arranged at an inner side of the carrier frame, in particular along the carrier rails which are arranged in pairs, in such a manner that the discharged air flow of the ventilation and/or heating element is directed into the seat member and/or the backrest. This enables heating and/or cooling of the backrest or the seat member.

A carrier frame which is constructed in a hollow manner can advantageously also be used to integrate in the hollow structure a cable guide for an illumination element which is arranged on the vehicle seat or a charging device for electronic mobile devices, or the like.

In order to adapt the carrier frame to the seat shape in an optimum manner, the carrier rails which are arranged in pairs preferably each have a first horizontal portion, which extends along the lateral edges of the seat member, and a second inclined portion which extends along the lateral edges of the backrest. In this instance, the second portion is rigidly connected to the first portion. An opening angle between the first portion and the second portion is in the range from 90-135 degrees so that the second portion of the carrier frame which extends along the backrest extends upwards in an oblique manner.

In a preferred embodiment, the backrest can be adjusted in terms of inclination. According to this variant, the back upholstery carrier is articulated so as to be able to be displaced in a linear manner along the carrier rails which are arranged in pairs in order to adjust the inclination of the backrest. One possibility for production according to the invention makes provision for the back upholstery carrier to be articulated to the carrier rails by means of prismatic joints in order to adjust the inclination of the backrest. According to this variant, rotary joints which limit the leg freedom of the person sitting behind are not required for adjusting the inclination of the backrest.

According to this variant, the seat upholstery carrier is also articulated so as to be able to be linearly displaced along the carrier rail in order to adjust the seat member. The backrest is further coupled to the seat member in a pivotably movable manner.

The vehicle seat according to the invention consequently enables an inclination adjustment which, starting from an upright seat position, does not limit the movement freedom, in particular the leg freedom of the person sitting behind, as the inclination of the backrest increases, but instead increases it. This is due to the fact that, as a result of the backrest and the seat member sliding forward along the carrier rails, an additional spatial region is opened at the knee height of the person sitting behind.

Preferably, the back upholstery carrier is articulated in a guiding groove of the carrier rail with a translational and a rotational degree of freedom by a coupling element in order to adjust the inclination of the backrest. The translational degree of freedom corresponds to the linear movement of the upholstery carriers along the guiding groove of the carrier rail. The rotational degree of freedom enables the coupling element to compensate for the changing opening angle between the backrest and the rigid carrier frame during an inclination adjustment of the backrest.

According to another variant, however, the coupling element can also enable additional degrees of freedom between the rear upholstery carrier and carrier frame.

According to a preferred embodiment, a headrest which is also referred to as a head portion below, is rigidly arranged on the carrier frame. One possibility for production according to the invention makes provision for the vehicle seat to be able to be moved, by adjusting the inclination of the backrest, from an upper seat position into a lower seat position in such a manner that the backrest in the upper seat position covers a part-region of an inner face of the headrest and, in the lower seat position, the part-region is exposed. That is to say, when the inclination is adjusted, the backrest and the seat member slide downwards along the guide rails, the backrest releasing a previously covered region of the headrest as an additional support face. There is thereby provided a mechanism which enables the support face provided for the passenger to be extended. This is particularly advantageous for tall passengers since vehicle seats are generally sized in such a manner that the upper end of the passenger seat or the head portion in the upright seat position generally terminates in the neck region of tall persons. The extended support face in the lower seat position then enables the head of the passenger to be supported.

In an advantageous variant of this embodiment, the headrest is formed in such a manner that it has concave dishing. The headrest advantageously comprises lateral wall-like sight screens for forming a lateral headrest. These also serve to visually separate a person seated in the adjacent seat.

According to a preferred embodiment, the carrier frame is constructed in an integral manner. In a particularly preferred manner, the carrier frame is constructed as a hollow aluminium profile-member which has been produced, for example, by means of a stretching/bending method.

According to another variant, the carrier frame may be assembled from a plurality of different components. To this end, different profile carriers can be welded to each other, screwed together or injection-moulded components can be joined together. According to another alternative, the carrier rails can be produced with a shell-like construction or by means of so-called "tailored blanks".

Another advantage of the invention is that a table or tray can be arranged at a rear side of the vehicle seat on the carrier frame. Since the carrier frame does not also move when the inclination of the backrest is adjusted, an inclination adjustment of the backrest consequently does not bring about any inclination of the table, it is thereby possible to dispense with complex additional frames which are used in the prior art in order to decouple the table from a movement of the backrest.

In order to receive impact energy at the rear side of the seat, a shock-absorbing element can be arranged in an upper end region of the carrier frame, for example, in the form of a Styropor insert. Alternatively, the strength or the thickness of the carrier frame in this portion may be configured in such a manner that impact energy can accordingly be absorbed, for example, caused by the impact of the head of the person sitting behind on the passenger seat in the event of a front-end crash. Depending on the embodiment of the carrier structure, the rear side of the head portion can also be constructed to receive/absorb crash energy; for example, by providing corresponding elements/regions for absorbing impact energy.

According to another aspect, a three-point safety belt and a belt redirection device may be secured to the carrier frame. In this instance, the belt redirection member is advantageously supported in a groove in the carrier frame in such a manner and coupled to the seat upholstery in such a manner that the belt redirection member also carries out the downward or upward movement when the inclination of the backrest is adjusted.

According to an embodiment, the carrier structure, in part-regions subjected to high load brought about by passengers, for example, by holding onto it, by sliding over the carrier frame or by means of malicious damage, can be provided with additional protection elements which prevent excessive signs of wear from occurring on the visible carrier frame. This can be achieved, for example, by means of films, rubber coatings or additional plastics components which are applied subsequently to the carrier frame.

The carrier frame is preferably constructed as a closed frame which surrounds the seat member and the backrest at the peripheral side. However, the carrier frame may also be partially open, in particular in the foot region of the seat. In this instance, the carrier frame may, for example, be rigidly connected to a carrier frame of an adjacent seat.

The invention further relates to an arrangement of vehicle seats comprising at least two of the vehicle seats, as described above. According to this embodiment, the arranged vehicle seats are connected to each other by means of a horizontal connection element or a cross-member. In this instance, the horizontal connection element may be rigidly fixed to the carrier frames of the seats, preferably the horizontal portions of the carrier frames. Alternatively, the horizontal connection element may also be fitted in a recess in the horizontal portion of the carrier frame. It is thereby possible, for example, for two mutually adjacent passenger seats of a coach to be arranged in a structurally simple manner as a unit. Another variant of this embodiment makes provision for one of at least two vehicle seats which are arranged in this manner to be supported so as to be able to be displaced along the horizontal connection element in order, for example, to be able to displace the gangway-side seat towards the gangway. With the carrier frame for the vehicle seat according to the invention, this can be achieved in a structurally very simple manner, for example, by there being fitted to the adjacent carrier frames of the passenger seats which are arranged beside each other corresponding through-holes in which a horizontal displacement rail is rigidly arranged.

According to another embodiment, gangway-side emergency lighting can be integrated in the carrier frame, for example, by corresponding illumination means, for example, LEDs, a strip of illumination means, etc., being secured to the carrier frame. Another advantage of the seat construction proposed is that the legally prescribed handrail can be provided by the carrier frame which surrounds the seat upholstery. To this end, there may be provided in the upper end region of the carrier frame at least a portion of the carrier frame whose diameter is sized in such a manner that the carrier frame at this location can be gripped by a hand so that the carrier frame can be used as a handle. An additional handrail can thereby be dispensed with.

BRIEF DESCRIPTION OF THE DRAWINGS

Other details and advantages of the invention are described below with reference to the appended drawings, in which.

DETAILED DESCRIPTION OF THE INVENTION

Figure 1:
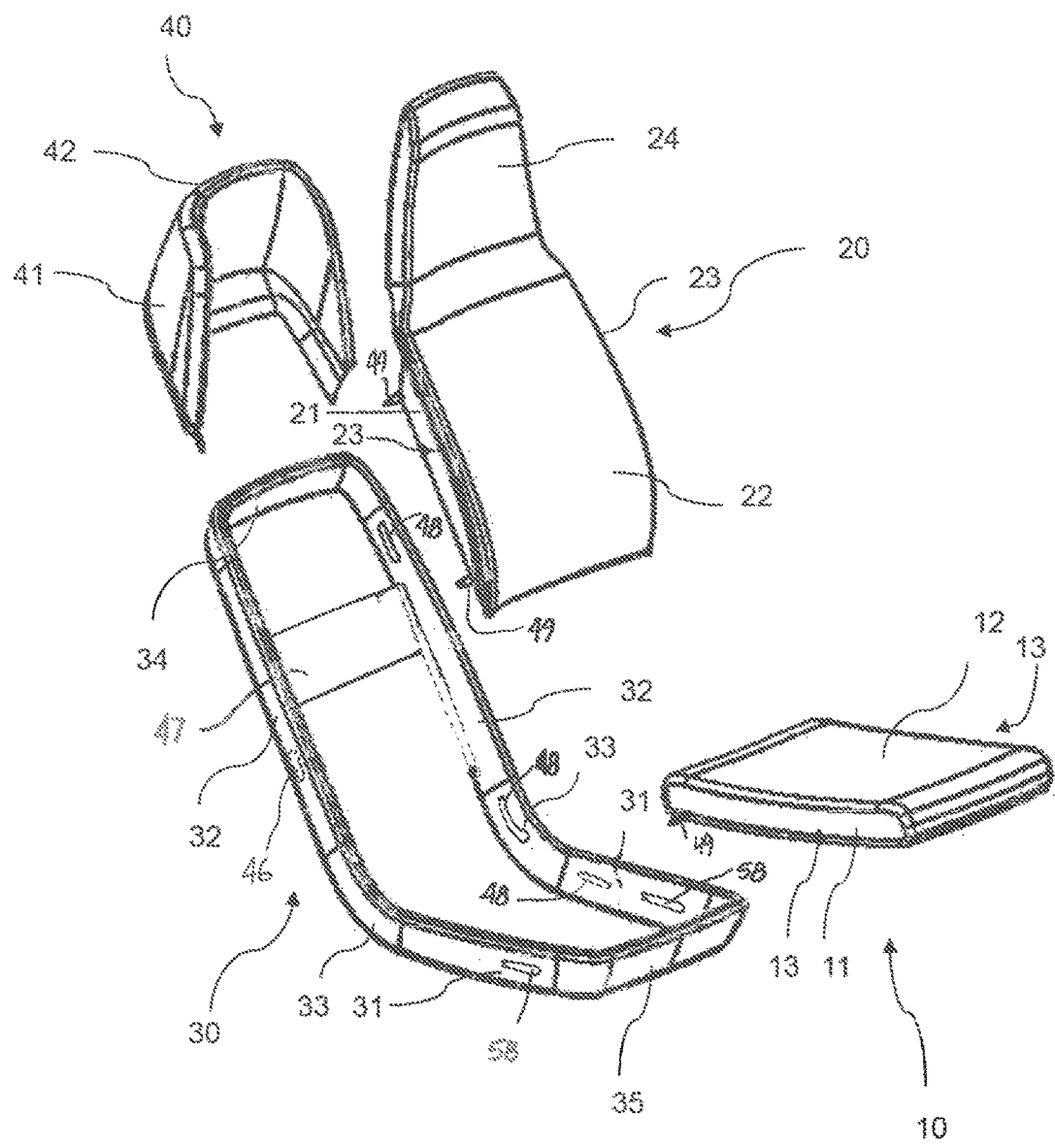
FIG. 1 is a schematic exploded view of a passenger seat according to an embodiment of the present invention.

FIG. 1 is an exploded view of an embodiment of the vehicle seat which is constructed as a passenger seat 1 for a bus. The passenger seat surface is formed by a seat member 10 and by a backrest 20. The seat member 10 has seat upholstery 12, which is rigidly secured to a seat upholstery carrier 11. The backrest 20 also comprises back upholstery 22 which is secured to a back upholstery carrier 21. In order to receive and fix the seat upholstery 12 and the back upholstery 22, the upholstery carriers 11, 21 have securing elements known from the prior art (not shown), for example, brackets, snap-hooks or securing clips. The seat member 10 and the backrest 20 are constructed in several parts or in several layers and each contain, for example, a resilient mat and are provided with an upholstery cover.

In contrast to the passenger seats known from the prior art, it is not absolutely necessary to incorporate other frame constructions, for example, in the form of a steel frame, in the seat member and the backrest in order to be able to receive the forces acting on the vehicle seat 1 as a support structure. Instead, the vehicle seat 1 has a rigid carrier frame 30 which is arranged at the peripheral side outside the seat member 10 and outside the backrest 20 and which is connected to the seat upholstery carrier 11 and the back upholstery carrier 21. The carrier frame 30 is consequently visible and is not covered by upholstery elements or by the upholstery cover. Nonetheless, when the carrier frame according to the invention is used, it may also be advantageous to introduce additional support elements in the backrest or in the seat member, in particular in part-regions of the prismatic joint receiving member or in the knee region of the person sitting behind.

In the present embodiment, the carrier frame 30 is constructed as a closed frame which surrounds the seat member and the backrest 20 at the peripheral side. In this instance, the carrier frame 30 comprises peripheral carrier rails 31, 32, 33, 34, 35 which are produced from an aluminium hollow profile-member. The carrier frame 30 can in this instance be produced in one piece using a stretching/bending method. The carrier frame 30 has carrier rails 31 which are arranged in pairs and which extend along opposing lateral edges 13 of the seat member 10, in particular the seat upholstery carrier 11. Furthermore, the carrier frame 30 comprises carrier rails 32 which are arranged in pairs and which extend along opposing lateral edges 23 of the backrest 20, in particular of the backrest upholstery carrier 21. The carrier rails 31 are connected to the carrier rails 32 by means of rigid, curved connection rails 33. The opening angle between the horizontal carrier rails 31 and the carrier rails 32 which are inclined upwards in an oblique manner is approximately 110 degrees. Depending on the desired shape of the seat, other opening angles can also be produced by means of corresponding bending or shaping of the carrier frame 30. The carrier frame 30 is rigid and consequently has no pivot joints.

Figure 2:
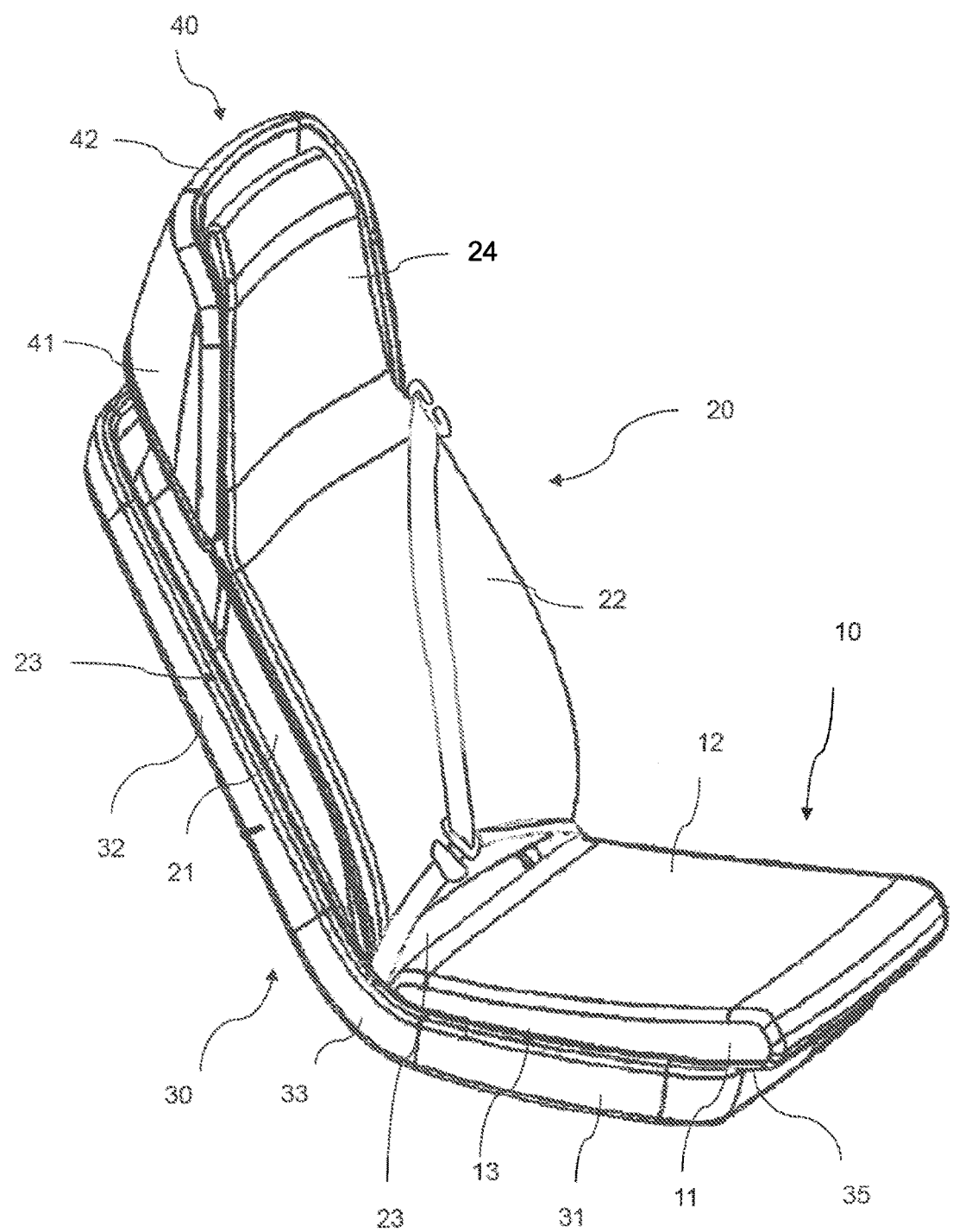
FIG. 2 is a schematic, perspective view of a passenger seat in an upper seat position according to an embodiment of the present invention.

FIG. 2 shows a passenger seat in the assembled state. The back upholstery carrier 21 and the seat upholstery carrier 11 are articulated so as to be able to be displaced along the lateral carrier rails 31, 32, 33 in order to adjust the inclination of the backrests 20. The articulation mechanism can be carried out as follows. According to the present embodiment, the inner side of the carrier rails 31, 32, 33 has a guiding groove 48 in which corresponding counter-pieces 49 engage which are secured to the lateral edges of the back upholstery carrier 21 and the seat upholstery carrier 11. The counter-piece 49 may be constructed, for example, as a nipple, which is articulated so as to be able to be displaced in the guide rail having a translational degree of freedom for moving along the guide rail and a rotational degree of freedom for compensating for the inclination of the back upholstery carrier 21 with respect to the rigid carrier frame 20. The seat upholstery carrier 11 and the back upholstery carrier 21 are each formed as a structural unit by an integral shell structure. In this instance, the guiding nipples 49 which engage in the displacement rails are advantageously formed on the shells produced by means of injection-moulding.

Figure 3:
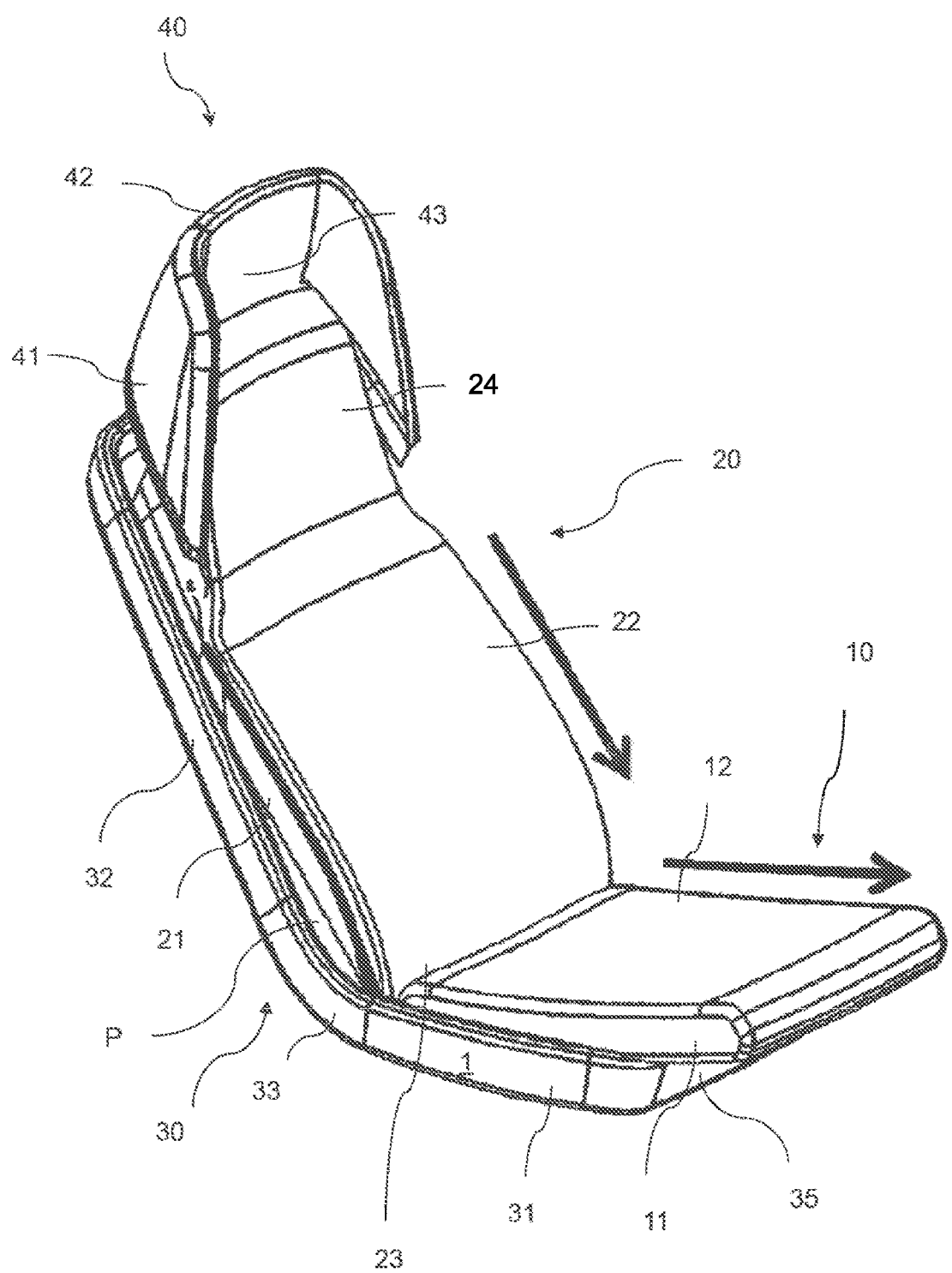
FIG. 3 is a schematic, perspective view of a passenger seat in a lower seat position according to an embodiment of the present invention.

FIG. 3 shows the vehicle seat in a lower seat position, in which the backrest 20, as indicated by the thick black arrow, has been moved downwards, At the same time, the seat member 10 has been displaced forwards in accordance with the indicated arrow direction. In an embodiment, however, in addition to the direction indicated, the seat member can also be displaced in on oblique, preferably upwardly directed direction in such a manner that, for example, the front end of the upholstery moves upwards or the rear end moves downwards. Accordingly, the movement of the seat member does not necessarily have to extend in a horizontal manner. As a result of the displacement of the backrest 20, the angle of inclination of the backrest 20 changes. For inclination adjustment, the backrest 20 is coupled in a pivotably movable manner to the seat member 10 in the connection region 25. The carrier frame 30 is constructed as a hollow structure so that elements of a ventilation and/or heating element can be integrated in the inner side, as described above.

A headrest 40 is further rigidly arranged on the carrier frame 30. When the inclination of the seat is adjusted from an upper position into a lower position, the headrest 40 consequently does not also move. The headrest 40 has an inner region 43 which adjoins the upper peripheral edge 42 of the headrest and which is at least partially covered by the upper portion 24 of the backrest 20 in the upper seat position (FIG. 2) but is exposed in the lower seat position (FIG. 3). The support face of the seat 1 can thereby be extended and an additional support region can be made available in the inner region 43 for leaning the head.

Another advantage of the present seat construction is that, when the backrest is adjusted from the upper position into the lower position, an additional spatial region is released behind the backrest 20 in the region P so that the spatial region for the person sifting behind is not limited by a backrest adjustment, but instead is increased in the knee region.

The headrest 40 has a concave dishing having side walls 41 which act as lateral headrests and serve to visually screen a person seated adjacent. In the lower seat position, the seat position of the passenger is lowered to such an extent that the head is generally positioned inside the lateral walls 41.

The headrest 40 may also be constructed as a multifunctional head module. The structural approach of the present invention enables the provision of a standardised vehicle seat 1 without the head module which can be adapted to various customer requests by means of various embodiments of the head module. The headrest 40 can thus be constructed as a comfort headrest with different upholstery variants or size dimensions. Furthermore, the head portion may be provided with an integrated USB connection, a monitor, illumination elements and/or loudspeakers, in particular an active noise compensation system (noise cancelling function). Different construction variants can thereby be implemented with a high degree of standardisation since only the head module has to be adapted in each case.

Another advantage is that the carrier frame according to the invention is particularly suitable for securing thereto gangway-side emergency lighting in the form of a strip of illumination means, LEDs 53 (FIG. 4) or other illumination means (not shown). Such illumination means cannot be readily secured to the fabric covers of conventional seat constructions.

As shown in FIG. 1, a conventional table or tray 47 may be connected directly to the rigid carrier frame 30. Since the tray 47 is connected to the rigid carrier frame 30, the tray does not move during an inclination adjustment of the backrest.

Figure 4:
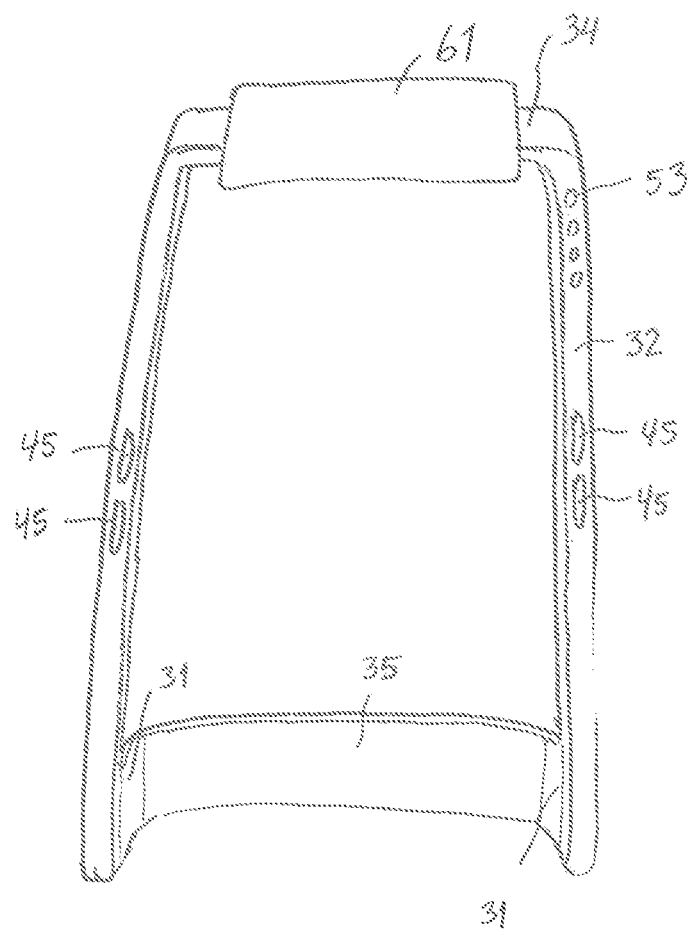
FIG. 4 is a rear view of a carrier frame of the passenger seat of FIG. 1.

According to yet another embodiment, discharge openings or ventilation nozzles 45 are disposed at a rear side of the carrier frame 30 (see FIG. 4). Furthermore, a ventilation or heating element 46 may be integrated into the hollow structure of the carrier frame 30.

According to another embodiment shown in FIG. 2, a three point safety belt 55 is secured to the carrier frame 30. A belt redirection member 56 may be coupled to a groove 45 in the carrier frame 30 in the same manner as the back rest so that the belt redirection member 56 carries out the downward and upward movement when the inclination of the backrest is adjusted.

In a further embodiment shown in FIG. 4, a shock absorbing element 61 for receiving impact energy is arranged at the upper end region 34 of the carrier frame to receive impact energy at the rear side of the seat.

Figure 5:
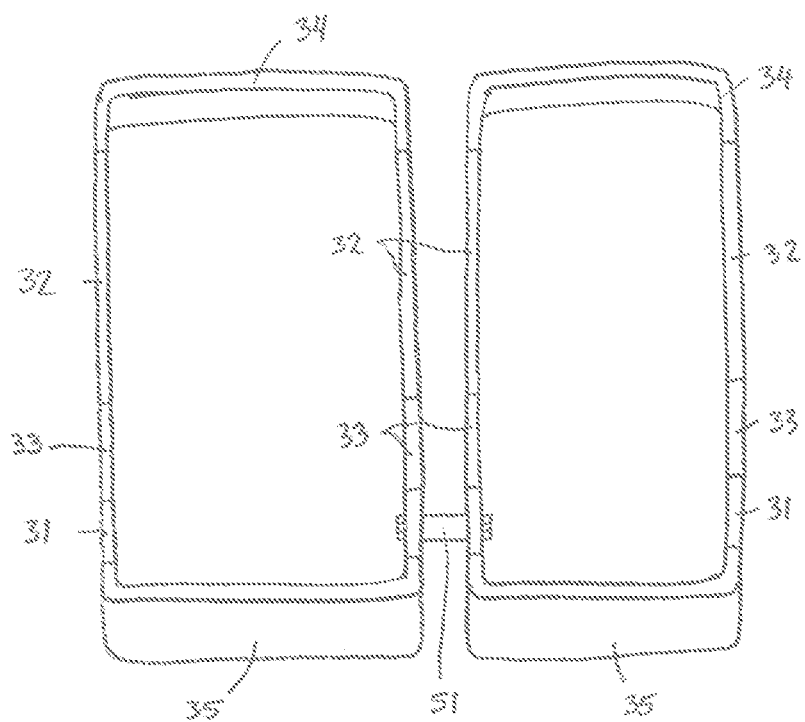
FIG. 5 is a front and top perspective view of an arrangement of vehicle seats showing only the carrier frames connected together.

In yet a further embodiment according to FIG. 5, at least two of the seats may be connected by a horizontal connection 51, which is rigidly connected to the carrier frame 30 of each of the at least two seats. For example, the horizontal connection 51 may be inserted or fitted in a recess 58 (see FIG. 1) in the horizontal portions 31 of two adjacent carrier frames 30. As shown in FIG. 1, the recess 58 may be elongated so that at least one of the carrier frames 30 can be displaced relative to the connection element 51.

LIST OF REFERENCE NUMERALS

1 Passenger seat
10 Seat member
11 Seat upholstery carrier
12 Seat upholstery
13 Lateral edge of the seat upholstery
20 Backrest
21 Back upholstery carrier
22 Back upholstery
23 Lateral edge of the back upholstery carrier
24 Upper end region of the backrest
25 Connection portion of back upholstery and seat upholstery
30 Carrier frame
31-35 Carrier rails of the carrier frame
40 Headrest
41 Side wall of the headrest
42 Upper peripheral edge of the headrest
43 Part-region of an inner face of the headrest

The invention claimed is:

1. A vehicle seat, comprising:
   a seat member having a seat upholstery carrier and seat upholstery, which is rigidly arranged on the seat upholstery carrier;
   a backrest having a back upholstery carrier and back upholstery, which is rigidly arranged on the back upholstery carrier;
   a support structure for receiving forces which act on the vehicle seat, the support structure being formed as a rigid carrier frame arranged at a peripheral side outside the seat member and the backrest and connected to the seat upholstery carrier and the back upholstery carrier, and the carrier frame being a closed frame having carrier rails arranged in pairs and which extend along opposing lateral edges of the seat member and the backrest, an upper end region horizontal rail connecting upper ends of the carrier rails, and a lower end region horizontal rail connecting lower ends of the carrier rails, and the carrier frame being constructed as a hollow structure; wherein the backrest is adjustable in terms of inclination relative to the carrier frame; and
   a headrest rigidly connected to the carrier frame at the upper end region horizontal rail, wherein the vehicle seat is movable from an upper seat position into a lower seat position by adjusting the inclination of the backrest, such that the backrest covers a part-region of an inner face of the headrest in the upper seat position and in the lower seat position the part-region is exposed, and wherein the headrest has lateral sight screens for forming a lateral headrest and visually separating an adjacent person.

2. The vehicle seat according to claim 1, wherein the vehicle seat is a passenger seat for a bus.

3. The vehicle seat according to claim 1, wherein at least one of the seat upholstery carrier and the back upholstery carrier is formed as a structural unit by an integral shell structure.

4. The vehicle seat according to claim 1, wherein:
   the closed frame surrounds the seat member and the backrest at the peripheral side.

5. The vehicle seat according to claim 1, wherein the carrier frame is constructed in an integral manner.

6. The vehicle seat according to claim 1, wherein the carrier frame has in the upper end region a shock-absorbing element for receiving impact energy.

7. The vehicle seat according to claim 1, wherein the seat upholstery carrier is articulated so as to be able to be displaced along the carrier rails for an adjustment of the seat member contemporaneously with adjusting the inclination of the backrest.

8. The vehicle seat according to claim 1, further comprising a table arranged at a rear side of the vehicle seat on the carrier frame.

9. The vehicle seat according to claim 1, further comprising an illumination element arranged on the vehicle seat, wherein a cable guide for the illumination element being integrated in the hollow structure of the carrier frame.

10. The vehicle seat according to claim 1, further comprising a three-point safety belt and a belt redirection device secured to the carrier frame.

11. The vehicle seat according to claim 1, wherein the carrier frame is constructed as a hollow aluminium rod element; and the seat upholstery and the backrest comprise an upholstery cover.

12. An arrangement comprising two vehicle seats in accordance with claim 1, the two vehicle seats being arranged so as to be orientated with respect to each other, the carrier frames of the two vehicle seats being connected to each other by a horizontal connection element rigidly connected to the carrier frames or fitted in a recess in a horizontal portion of the carrier frames.

13. The arrangement of vehicle seats according to claim 12, wherein the horizontal connection element is inserted in an elongated recess in the carrier frame of one of the two vehicle seats so that the one of the two vehicle seats is displaceable relative to the horizontal connection element.

14. The vehicle seat according to claim 1, further comprising at least one of a ventilation element and a heating element integrated in the hollow structure of the carrier frame, the carrier frame having, at a rear side of the vehicle seat, discharge openings or ventilation nozzles with an adjuster for the one of the ventilation element and the heating element.

15. The vehicle seat according to claim 14, further comprising discharge openings of the one of the ventilation element and heating element arranged at an inner side of the carrier frame thereby enabling at least one of heating and cooling of the backrest or the seat member.

16. The vehicle seat according to claim 1, wherein each of the carrier rails have a horizontal first portion arranged at the peripheral side at the lateral edges of the seat member, and an inclined second portion arranged at the peripheral side at the lateral edges of the backrest, the second portion being rigidly connected to the first portion and an opening angle between the first portion and the second portion being in the range from 90° to 135°.

17. The vehicle seat according to claim 1, wherein the headrest has a concave dishing that defines the lateral sight screens.

* * * * *